United States Patent [19]
Weller

[11] 3,898,541
[45] Aug. 5, 1975

[54] CAPACITORS AND METHOD OF ADJUSTMENT

[75] Inventor: Barton L. Weller, Easton, Conn.

[73] Assignee: Vitramon, Inc., Bridgeport, Conn.

[22] Filed: Dec. 17, 1973

[21] Appl. No.: 425,224

[52] U.S. Cl............. 317/261; 29/25.42; 317/249 R
[51] Int. Cl.$^2$.................... H01G 1/147; H01G 4/06
[58] Field of Search................ 317/242, 261, 249 R; 29/25.42

[56] References Cited
UNITED STATES PATENTS

| | | | |
|---|---|---|---|
| 3,448,355 | 6/1969 | Ahearn | 317/261 |
| 3,586,933 | 6/1971 | Bonini | 317/242 X |

*Primary Examiner*—E. A. Goldberg
*Attorney, Agent, or Firm*—Arnold Grant

[57] ABSTRACT

Adjustable multilayer monolithic capacitors having at least one connecting electrode embedded within or on a surface of the monolithic body and connected to one of the terminal ends, the connecting electrode having at least one additional conductive tab extending to the surface of the capacitor at a side or sides thereof distinct from the terminal ends. Incremental adjusting electrodes which are not in contact with the two terminal ends are included within the capacitor. Each of the adjusting electrodes also has an external conductive tab extending to the same side or sides of the capacitor as does the tab or tabs of the connecting electrode. Incremental adjustment of the capacitance of the capacitor is made by external interconnections, or conductive islands between the exposed tabs of the adjusting electrodes and the connecting electrodes.

13 Claims, 4 Drawing Figures

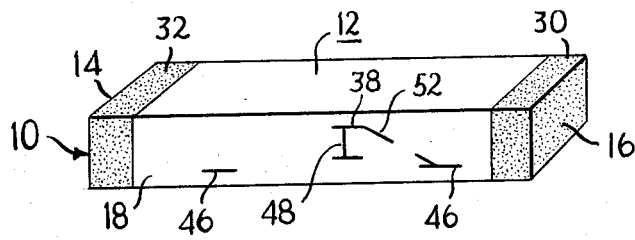
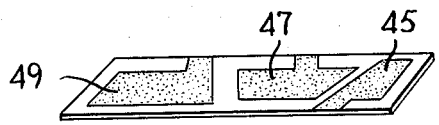
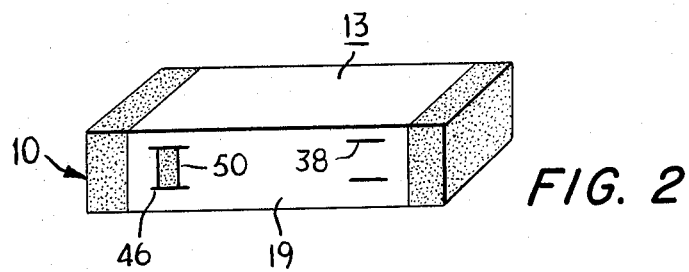
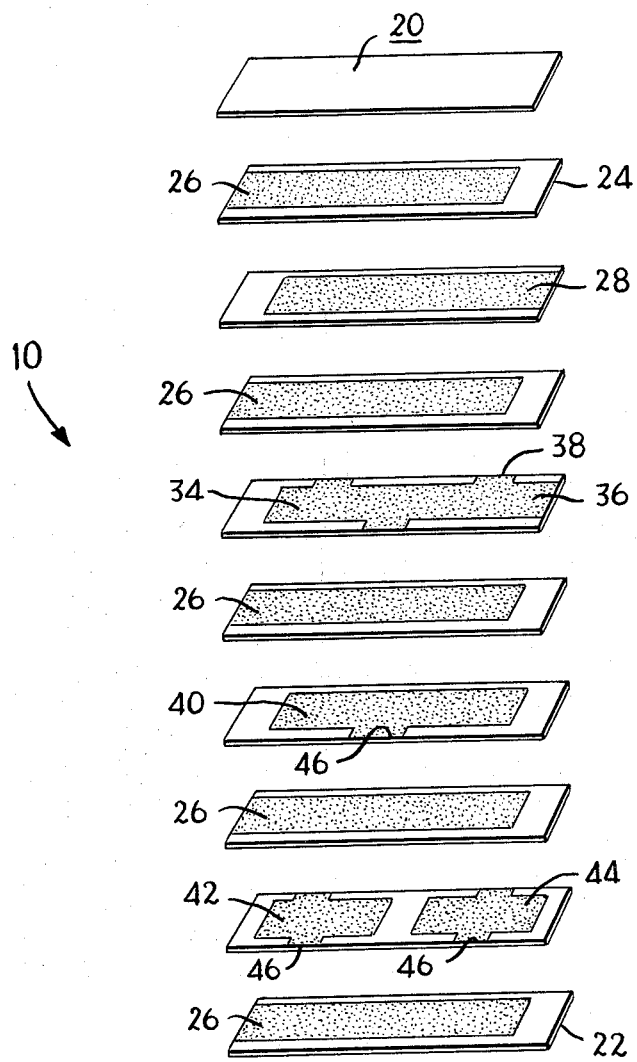

CAPACITORS AND METHOD OF ADJUSTMENT

BACKGROUND OF THE INVENTION

Multilayer monolithic ceramic capacitors, often referred to as chip capacitors, consist of alternate layers of an electrically non-conductive ceramic dielectric material which seperate alternately polarizable refractory, electrically conductive metal electrodes. The structure is generated in a "green" state and fired. The ceramic provides not only the dielectric layers but also the mechanical matrix for the electrodes and the encasement system which affords the unit its physical geometry and environmental protection.

Alternate layers of electrode commonly extend to opposite ends of the capacitor and are interconnected at the ends by a metal coating composition, usually a noble metal such as silver combined with a glass, which is also fired, and thereby bonded to the ends of the capacitor. The metal coating composition on the ends not only connects each electrode layer of like polarity but also provides a solderable media. Solder is commonly used to attach leads to the capacitor or to directly connect the capacitor to a circuit substrate.

The electrode layers within the capacitor of opposite polarity are overlapped so that each layer includes a terminal or margin portion and an electric field region which overlaps a similar region in an adjacent electrode layer of opposite polarity. The performance of the capacitor is established by the dielectric within the electric field region. Since it is the electric field or active region which accepts the charge, withstands the high potential gradient, and stores the electrical energy, it follows that it is the region in which capacitance failure or degradation is most likely to occur.

These ceramic capacitors are, for the most part, readily manufactured within acceptable capacitance tolerances although it is not atypical for a particular batch to have capacitance values which vary over a range of 40 percent or more. In applications where close accuracy in capacitance values is required, e.g., tolerances of plus or minus 1 percent from the rated value, or where in situ adjustment of capacitance value is desired, the usual procedure is to individually test and select capacitors having a capacitance value greater than the desired value and to trim these capacitors down to the desired value by removing portions of the electric field region either by cutting and/or by sandblasting into the structure. Several systems for selectively removing electrode material while monitoring the capacitance value of the capacitor are known in the prior art. Examples of these are U.S. Pat. Nos. 2,603,737 and 2,712,172. Other examples of the state of the art are U.S. Pat. No. 3,235,939 which shows multilayer capacitors calibrated by grinding away a portion of the electric field region from a side edge of the capacitor; U.S. Pat. No. 3,456,170 which shows electrode material being dished out from one of the plane surfaces of the capacitor and an insulating glaze placed over the exposed electric field region; and, British Pat. No. 1,180,928 which teaches the capacitor being made so as to have a plurality of electrode areas of discrete size which are successively cut out as the capacitance is monitored. A still more recent developement includes U.S. Pat. No. 3,648,132 which discloses layers of electrode material embeded entirely within the capacitor so that their margin portions are positioned short of the edge. By removing some of the dielectric material which seprates the concealed electrode margins from the edge, the concealed electrodes can be exposed and then electrically connected to the electrodes terminating at that end.

In each of the aforementioned prior art systems either the electric field region or the immediately adjacent dielectric region is abraded or otherwise disturbed. In some of the prior art processes, the outer dimensions of the capacitor are changed during adjustment by varying amounts which results in a nonuniform product. More importantly though, by exposing the nascent electric field region to foreign environmental elements, the dielectric strength and other essential properties of the capacitor are seriously impaired. To offset these objections somewhat, U.S. Pat. Nos. 3,456,170 and 3,394,386 have suggested placing a ceramic material over the exposed region and firing it. However, the possibility for damage arises when the critical electric field region is first exposed. In addition to possible deleterious effects, each of the prior art systems involve considerable processing labor and equipment which makes it quite expensive to perform an adjustment in capacitance value. Since certain of the adjustment devices require that electrical contact be made so as to monitor capacitance value during the grinding process it is evident that the instrumentation must be quite sturdy to withstand the constant vibration and abrasive atmosphere.

SUMMARY OF THE PRESENT INVENTION

The present invention is directed to overcoming the above described problems of production and/or in situ adjustment of capacitance value of multilayer monolithic ceramic capacitors. More particularly, the present invention solves these problems by providing a monolithic ceramic capacitor which can be both upwardly and downwardly adjusted without altering, cutting into, or otherwise affecting the integrity of either the electric field or the dielectric material adjacent to the electric field of the capacitor. As more fully delineated hereinafter, the present invention is directed to monolithic capacitors having at least one connecting electrode either substantially embedded within the monolithic body or coated onto an outer surface of the capacitor, the connecting electrode having a first terminal portion which extends to and is coextensive with at least a portion of the surface of the monolithic body at one of the end terminals of the capacitor and an additional tab portion which extends to and is coextensive with at least a portion of one of the two side surfaces of the monolithic body intermediate the end terminals thereof. That is, as more fully explained hereinafter, a monolithic capacitor according to the present invention is defined as a six-sided monolith consisting of two end terminals, two major surfaces, i.e., a top and a bottom, both of which are in planes substantially parallel to the planes of the electrodes of the capacitors and two side surfaces, both of which are in planes substantially perpendicular to the planes of the electrodes of the capacitor.

The capacitor of the present invention further contains one or more adjusting electrodes. Each of the adjusting electrodes are embedded within the body of the monolithic capacitor and each has a tap portion which extends to and is coextensive with one of the two side surfaces of the capacitor. Electrical interconnection, and thus both upward and downward incremental adjustment of the capacitor is provided by a series of conductive islands which extend along the surface of the monolithic body between the tap portion of the connecting electrode and the tap portions of the adjusting electrodes. That is, since the connecting electrodes each have a first terminal portion which extends to and is coextensive with the end terminals of the capacitor, thereby integrating this electrode into the electric field of the capacitor, the electrical interconnection between the tab portion of a connecting electrode and the tab portion of an adjusting electrode incorporates that particular adjusting electrode into the electric field of the capacitor. Similarly removing or disrupting the conductive island removes that particular adjusting electrode from the electric field of the capacitor.

As explained the conductive islands interconnecting the tap portions of the connecting electrodes and the tab portions of one or more of the adjusting electrodes are along the external surfaces of the capacitor body, preferably along a side surface and most preferably along a single side surface of the body. Accordingly, creating or disrupting conductive islands and, thus, upward and/or downward adjustment of the capacitance value of the capacitor can be easily and readily accomplished both by the manufacturer and in situ by the user without concomitantly disturbing or effecting the integrity of the capacitor body.

BRIEF DESCRIPTION OF THE INVENTION

FIG. 1 is a perspective view of an adjustable monolithic ceramic capacitor in accordance with the present invention.

FIG. 2 is a perspective view of the adjustable monolithic ceramic capacitor shown in FIG. 1 wherein the capacitor has been revolved 180° on its long axis to show the bottom and side thereof out of view in FIG. 1.

FIG. 3 is an exploded view of the capacitor plate containing layers of the monolithic ceramic capacitor shown in FIGS. 1 and 2; and, FIG. 4 is a perspective view of an adjusting capacitor plate containing layer according to the present invention.

DETAILED DESCRIPTION OF THE INVENTION

Referring now to FIGS. 1, 2 and 3 a monolithic ceramic capacitor 10 having a rectangular body is comprised of a top 12, a bottom 13, a first terminal end 14, a second terminal end 16, a first side 18 and a second side 19. Multilayer monolithic ceramic capacitors of this type are generally made by stacking together alternate layers of ceramic dielectric material and electrode material. The structure is laminated in a green state and fired. Each ceramic layer has printed upon it, usually by silk screening, an electrode layer in the form of a refractory metal paste such as platinum or other noble metal or mixture of noble metals which will withstand the very high firing temperatures required for the ceramic. Except for the upper and lower outer layers 20, 22 which protect and seal the electrodes within the capacitor, the remaining internal ceramic layers 24 are alternately printed with electrodes 26 terminating at the first terminal end 14 of the capacitor and electrode layers 28 terminating at the second terminal end 16 of the capacitor. Each electrode has a marginal portion immediately adjacent and coextensive with the terminal end of the capacitor to which it extends and an electric field region which is the area of the electrode overlapping the adjacent electrodes of opposite polarity. The marginal portions of the electrodes are electrically connected together by an external coating of a metal-frit mixture 30,32 such as silver-glass which is bonded to the terminal ends 14, 16 usually by firing.

In prior art monolithic ceramic capacitors where the electrodes are entirely embedded within the body, adjustment of capacitance value has heretofore been accomplished by cutting into the capacitor and removing dielectric material so as to expose the electric field region of the electrodes. That is, the means of adjusting the capacitance value of a capacitor is to either add to or withdraw electrode area from the electric field. Heretofore, the most common method for accomplishing this adjustment was by physically cutting into the capacitor adjacent a terminal end, top or side thereof to expose electrodes and then either physically removing electrode area such as by cutting or by electrically joining additional electrodes embedded in the capacitor for this purpose or by disrupting such interconnections.

The deleterious effects of such a procedure are evident. The grinding operation which exposes the electric field fegion of the electrodes subjects the electrodes to contamination. This can happen even though the exposed layers are subsequently resealed, such as by applying glass or ceramic material having a lower firing temperature than the dielectric material and refiring the capacitor. Grinding presents a particularly difficult problem due to possible smearing of the closely spaced electrodes of opposite polarity, resulting in short circuits. Contamination, degradation and smearing of conductive electrodes into the dielectric are prime causes of capacitor failure.

The present invention, in addition to overcoming each of these problems, provides means for both a manufacturer to increase his yield from any given production batch and provides a means for readily accessible in situ adjustment of capacitance value by the user. That is, if the specification tolerances of users of these capacitors will not accept full variance from the mean capacitance of the production batch, a portion thereof will either have to be sold at a reduced price or scraped. Similarly, an increasing number of circuits and systems require capacitors which can be quickly and easily adjusted in situ relative to other variables in the circuit or system.

As shown in FIGS. 3 and 4, the present invention solves this problem by providing a connecting electrode 34 having a first terminal portion 36 which extends to and is coextensive with one of the end terminals of the capacitor. In the embodiment of the present invention shown in FIGS. 1 and 2 the first terminal portion extends to the second terminal end 16 of the capacitor. The connecting electrode further contains at least one tab 38 which extends to and is coextensive with a side surface of the capacitor body. In the embodiment shown in FIG. 2 there are tabs 38 extending to and coextensive with both the first and second sides of the capacitor at points intermediate the terminal ends thereof. It should be understood at this juncture, that the embodiments described herein are only illustrative of the present invention and are not intended as limiting. It is within the scope of the present invention to have more than one connecting electrode, to have the internal electrodes extend to different terminal ends of the capacitor and for the connecting electrodes to have more than one tab 38 extending to and coextensive with any side surface of the capacitor. For example, it is within the scope of the present invention to have a series of connecting electrodes certain of which have their first terminal portions 36 extending to and coextensive with the first end terminal 14 of the capacitor and others of which have their first terminal portions 36 extending to and coextensive with the second end terminal 16 of the capacitor. It is also within the scope of the present invention to have a connecting electrode with two or more tabs 38 extending to the same side of the capacitor.

The present invention further comprises a plurality of adjusting electrodes 40, 42, 44, 45, 47, 49. Each of the adjusting electrodes is entirely embedded within the body of the capacitor except for tabs 46 which extend to and are coextensive with one or both of the side surfaces of the capacitor. As best shown in FIGS. 3 and 4 adjusting electrodes may be of any desired area. Adjusting electrode 40 is, for example, a full area, adjusting electrodes 42 and 44 are one-half, adjusting electrode 45 is one-sixth, adjusting electrode 47 is one-third and adjusting electrode 49 is three-eighths of a full area. As shown in FIG. 4 several adjusting electrodes may occupy a single plane or layer of the capacitor. These areas can be of such or other values and the embodiments shown in FIGS. 3 and 4 are only illustrative of the present invention. The preferred embodiment of the present invention has a series of incremental value adjusting electrodes to permit a full range of incremental adjustment of the capacitor.

Electrical interconnection between the adjusting electrodes and the electric field of the capacitor is through the tabs 38 of the connecting electrodes 34 and a series of discrete conductive islands along the side surfaces of the capacitor. The conductive islands are preferably comprised of the same type of metal-frit mixture which forms the coating 30, 32 on the terminal ends of the capacitor, although any conductive material which can be bonded or fired to the capacitor or even a "junper" wire can be used for this purpose. In the perspective view of the invention depicted in FIG. 1 the conductive island is a show as a relatively thin wire 48 preferably soldered or otherwise bonded to the side 18 of the capacitor and soldered or otherwise bonded to the tab 38 of a connecting electrode 34 and the tab 46 of an adjusting electrode. In the perspective view of the invention depicted in FIG. 2 the conductive island 50 is a discrete strip of metal-frit mixture fired to the side surface 19 of the capacitor to thereby electrically interconnect the tab 38 of the connecting electrode and the tab 46 of an adjusting electrode. FIG. 1 also shows a conductive island 52 which has been severed to incrementally decrease the capacitance value of the capacitor.

In one preferred embodiment of the present invention the conductive islands interconnecting the connecting electrodes and the adjusting electrodes are metal-frit strips added and fired onto the capacitor by the manufacturer in the same operation as the coating 30,32 of the terminal ends 14,16. The conductive islands thus provide a solderable media. In another preferred embodiment the capacitor manufacturer selects a metal or alloy for the conductive island such as gold or palladium which would render the conductive islands bondable. In this manner the replacing of a disconnected island could be made with a pressure bonded conductive wire or jumper.

In the practice of the invention either the capacitor manufacturer or the ultimate user can connect and disconnect conductive islands as conditions warrant to incrementally adjust the capacitance value of the capacitor. As can be readily appreciated both the procedure of incrementally increasing and decreasing capacitance value either by adding or severing a conductive island along the external surface of the capacitor body does not in any way disturb the integrity of the capacitor. Thus, the present invention eliminates the problems of contamination and dissipation and the concomitant capacitor failure prevelant with prior art methods.

As this invention may be embodied in several forms without departing from the spirit or essential character thereof the present embodiments are illustrative and not restrictive. The scope of the invention is defined by the appended claims rather than by the description preceding them, and all embodiments which fall within the meaning and range of equivalency of the claims are, therefore, intended to be embraced by those claims.

I claim:

1. A multilayer monolithic ceramic capacitor comprising a dielectric material body, a first group of electrode layers embedded within the dielectric material body of the capacitor, each of said electrode layers having a margin portion and an electric field region, said first group of electrodes being divided into two sets with the margin portions of the electrodes of one set extending to and coextensive with one terminal end of the capacitor and the margin portions of the electrodes of the other set extending to and coextensive with the other terminal end of the capacitor; a conductive coating on each terminal end of the capacitor, said conductive coating electrically connecting together each of the electrodes having a margin portion extending to and coextensive with said terminal end; at least one connecting electrode each of said connecting electrodes having at least one tab extending to and coextensive with a side surface of the capacitor and a first terminal portion extending to and coextensive with one of the terminal ends of the capacitor, the connecting electrode being electrically connected through the first terminal portion and the conductive coating on said terminal end to each of the electrodes having a margin portion extending to and coextensive with that terminal end; and, at least one adjusting electrode embedded within the dielectric material body of the capacitor, each of said adjusting electrodes having at least one tab which extends to and is coextensive with a side surface of the capacitor.

2. A multilayer monolithic ceramic capacitor according to claim 1 further comprising at least one conductive island electrically interconnecting a tab of a connecting electrode and a tab of an adjusting electrode said conductive island being discrete from the conductive coating on each of the terminal ends of the capacitor.

3. A multilayer monolithic ceramic capacitor according to claim 2 wherein said conductive island is comprised of a solderable media.

4. A multilayer monolithic capacitor as defined in claim 1 wherein the connecting electrode has at least one other tab extending to and coextensive with the other side surface of the capacitor.

5. A multilayer monolithic ceramic capacitor according to claim 2 wherein said conductive island is a conductive wire fixedly attached to each of said tabs.

6. A multilayer monolithic ceramic capacitor according to claim 1 wherein said adjusting electrode encompasses less area than the electric field region of an electrode of the first group of electrodes.

7. A multilayer monolithic ceramic capacitor according to claim 1 wherein there are at least two adjusting electrodes in one layer of the capacitor.

8. A multilayer monolithic ceramic capacitor according to claim 1 wherein the connecting electrode has at least two tabs extending to and coextensive with a side surface of the capacitor.

9. A multilayer monolithic ceramic capacitor according to claim 2 wherein said conductive island is comprised of a bondable alloy.

10. A multilayer monolithic ceramic capacitor according to claim 1 wherein the connecting electrode is embedded within the dielectric material body of the capacitor.

11. A multilayer monolithic ceramic capacitor according to claim 1 wherein the connecting electrode is coated onto one of the surfaces of the capacitor said surface being a plane parallel to the electrode layers.

12. A method of making a capacitor comprising providing a dielectric material body, a first group of electrode layers embedded within the dielectric material body of the capacitor, each of said electrode layers having a margin portion and an electric field region, said first group of electrodes being divided into two sets with the margin portions of the electrodes of one set extending to and coextensive with one terminal end of the capacitor and the margin portions of the electrodes of the other set extending to and coextensive with the other terminal end of the capacitor; at least one connecting electrode; each of said connecting electrodes having at least one tab extending to and coextensive with a side surface of the capacitor and a first terminal portion extending to and coextensive with one of the terminal ends of the capacitor and, at least one adjusting electrode embedded within the dielectric material body of the capacitor, each of said adjusting electrodes having at least one tab which extends to and is coextensive with a side surface of the capacitor forming a conductive coating on each terminal end of the capacitor, said conductive coating electrically connecting together each of the electrodes having a margin portion extending to and coextensive with said terminal end; and of depositing a discrete island of conductive material along the side surface of the capacitor to which the tabs of a connecting electrode and an adjusting electrode are coextensive to thereby electrically connect the adjusting electrode and the connecting electrode.

13. A process according to claim 12 further comprising the step of depositing at least one additional discrete island of conductive material along the side surface of the capacitor to electrically interconnect at least one tab of a connecting electrode and tabs of at least two adjusting electrodes.

* * * * *